US008583948B2

(12) United States Patent
Lake et al.

(10) Patent No.: US 8,583,948 B2
(45) Date of Patent: Nov. 12, 2013

(54) METHOD, APPARATUS AND SYSTEM FOR DETERMINING AN INTERFACE DURING A POWER STATE TRANSITION

(75) Inventors: Christopher J. Lake, Folsom, CA (US); Michael N. Derr, El Dorado Hills, CA (US); Bhushan Vaidya, Folsom, CA (US); William Knolla, Folsom, CA (US); Yitschak Kapschitz, Nantes (FR); Reuven Rozic, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 13/175,723

(22) Filed: Jul. 1, 2011

(65) Prior Publication Data
US 2013/0007476 A1   Jan. 3, 2013

(51) Int. Cl.
*G06F 1/00* (2006.01)
*G06F 3/00* (2006.01)

(52) U.S. Cl.
USPC ............................ 713/300; 710/38

(58) Field of Classification Search
USPC ......................................... 713/300; 710/38
See application file for complete search history.

(56) References Cited

U.S. PATENT DOCUMENTS 7,599,323 B2 * 10/2009 Chandranmenon et al. .. 370/328
7,634,720 B2 * 12/2009 Haluptzok et al. ............ 715/234
8,380,879 B2 * 2/2013 Tischer et al. ................ 709/246

* cited by examiner

*Primary Examiner* — Mark Connolly
(74) *Attorney, Agent, or Firm* — Blakely, Sokoloff, Taylor & Zafman LLP (57) ABSTRACT

Techniques for determining a communication interface of a computer platform. In an embodiment, a power management unit of a computer platform provides to an agent of the platform an indication of a power state. In certain embodiments, the agent determines, based on the indication of the power state, that an interface is expected to be available. The agent may designate information for transmission via the first interface—e.g. in lieu of transmitting the information via a second interface which is available prior to the first interface becoming available.

20 Claims, 6 Drawing Sheets

METHOD, APPARATUS AND SYSTEM FOR DETERMINING AN INTERFACE DURING A POWER STATE TRANSITION

BACKGROUND

1. Technical Field

Embodiments relate generally to techniques for determining an interface for communications within a computer platform. More particularly, certain embodiments determine a communication interface during a power state transition.

2. Background Art

In a conventional computer platform, one or more comparatively high-speed, high-power interfaces may be powered-down while the platform is in a low power state—e.g. to decrease power consumption in the platform. While such a platform is subsequently transitioning, for example, from a low power state to a comparatively high power (e.g. fully functional) state, one or more agents within the platform may exchange messages with one another—e.g. to communicate information necessary to complete a power state transition.

Under current techniques, such an agent will identify some currently-available interface for such a message exchange, and communicate the information via the identified interface. More particularly, current techniques are only concerned with the agent choosing from interfaces which are available when the agent is determining an interface to use for such message exchanges.

As networking, power management and other technologies continue to push for more time-sensitive performance parameters, computer architectures are under increasing pressure to provide incremental improvements in their operating speed.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide for mechanisms to determine an interface for communication between agents of a computer platform. In an embodiment, a power management unit (PMU) of a platform may send to an agent an indication of a power state to which (or through which) the platform is to transition. Based on the indication provided by the PMU, the agent may determine that a hardware interface of the platform is to become available—e.g. at some future time with respect to the time of such determining.

At some point prior to the hardware interface becoming available, the agent may identify some information that needs to be communicated to another agent of the platform. The agent may further determine that some other hardware interface (other than the interface which is expected to become available) is already available for communicating such information to the other agent. In response to the determining that the interface is expected to become available, the agent may designate the information for transmission via the first interface—e.g. rather than transmitting the information via the earlier-available other interface.

Figure 1:
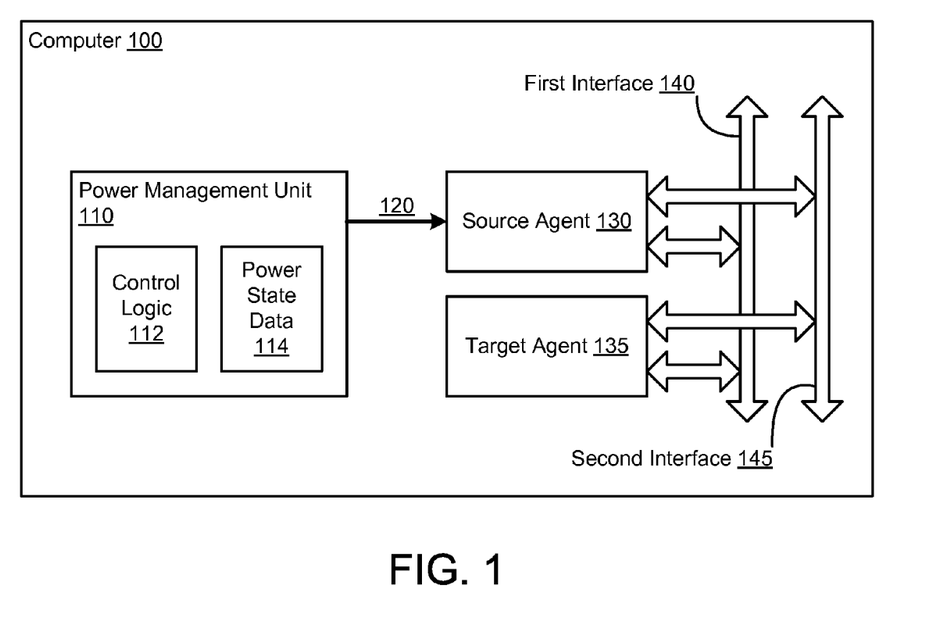
FIG. 1 is a block diagram showing select elements of a computer for performing a power state transition according to an embodiment.

FIG. 1 illustrates select elements of a computer 100 for determining a communication path according to an embodiment. Computer 100 may, for example, include a desktop computer, server computer, laptop computer, or handheld device such as a tablet, palmtop, digital music player, smart phone, digital camera, or other such device suitable for exchanging and processing data.

In an embodiment, computer 100 includes a power management unit (PMU) 110 coupled to variously provide power management control signals to one or more other components of computer 100. PMU 110 may, for example, have control logic 112—e.g. any of a variety of combinations of hardware, firmware and/or executing software—to control a power state transition of computer 100. By way of illustration and not limitation, control logic 112 may variously send respective signals to control one or more of a power plane, a configuration of one or more components for various respective operating modes, a collecting and/or providing of power performance information such as smart battery data, a supplying of a voltage signal, clock signal, etc. to one or more components, and/or the like. Some signaling by PMU 110 may be according to known power management techniques, and may not be limiting on certain embodiments.

Figure 3:
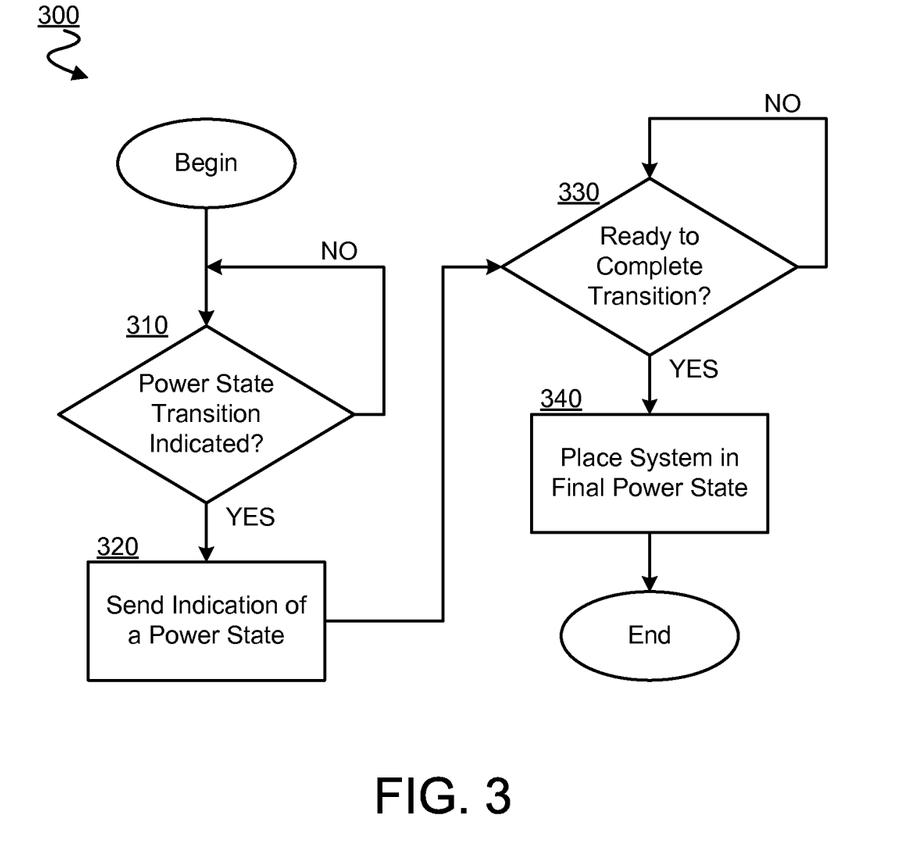
FIG. 3 is a flow diagram showing select elements of a method for performing a power state transition according to an embodiment.

In an embodiment, a first agent—e.g. including circuit logic, executing software, and/or the like—of computer 100 may provide information to another agent of computer 100 in response to, in support of, or otherwise based on a power state transition of computer 100. By way of illustration and not limitation, an illustrative source agent 130 and target agent 135 are shown in FIG. 3, where source agent 130 is to provide information to target agent 135 in response to one or more signals 120 from PMU 110 indicating a power state transition. Although certain embodiments are discussed herein with regard to source agent 130 being a source of a communication sent to some target agent 135, source agent 130 may, in certain embodiments, be a target with respect to the exchanging of one or more other communications.

Source agent 130 and target agent 135 may include any of a variety of agents which send and/or receive information (e.g. commands, addressing information, configuration or other data, etc.) based on a power state transition. By way of illustration and not limitation, such agents may include, but are not limited to, one or more of a Gigabit Ethernet controller or other wired (and/or wireless) network interface device, a battery pack (e.g. with smart battery data capability), a memory controller, an input/output (I/O) controller, a bus controller, a processor, a memory device, a driver, an input/output device, a peripheral and/or the like. In an embodiment, source agent 130 and target agent 135 are different functional elements of a single component of computer 100—e.g. where one agent is an on-chip element residing on an integrated circuit (IC) chip of a device within computer 100, and the other agent is an off-chip component of that same device.

Control logic 112 may generate the one or more signals 120 based on power state data 114 which describes, identifies or otherwise indicates one or more previous, current and/or intended power management conditions and/or processes of computer 100. Power state data 114 may, for example, include data indicating one or more power states—e.g. including, but not limited to, one or more various global power states, system power states, device power states, processor power states, power performance states, and/or the like. Such power states may be identified, for example, according to the Advanced Configuration and Power Interface (ACPI) standard, although certain embodiments are not limited in this regard. Alternatively or in addition, power state data 114 may include data describing, identifying or otherwise indicating one or more conditions and/or processes which comprise a particular power state and/or a particular transition from one power state to another. For example, power state data 114 may include data which directly or indirectly indicates that a particular power state transition results in, or otherwise includes, an availability of a particular resource (e.g. an interface) of computer 100. Such data may be recognized by one or more components of computer 100 which are controlled by PMU 110—e.g. based on some initial configuration of computer 100.

Based on power state data 114, the one or more signals 120 may, for example, directly or indirectly indicate that a hardware interface of computer 100—e.g. first interface 140—is to be made available during (and/or as a result of) a power state transition. Based on such one or more signals 120, source agent 130 may determine that first interface 140 is expected to be available after computer 100 transitions to a particular power state—e.g. a final power state of a power state transition or some intermediary power state which is part of the power state transition.

By way of illustration and not limitation, one or more signals 120 may include an identifier of first interface 140. Alternatively or in addition, one or more signals 120 may include an identifier of a power state transition and/or, more particularly, an identifier of a particular power state associated with such a power state transition. Source agent 130 may include or otherwise have access to information which associates an identifier in one or more signals 120 with first interface 140.

At some point prior to first interface 140 becoming available, source agent 130 may have some information for transferring to target agent 135. Such information may, for example, include configuration data, commands, etc. which are required for completing a power state transition, although certain embodiments are not limited in this regard. Prior to first interface 140 being available to source agent 130, another hardware interface of computer 100—e.g. a second interface 145—may be identified by source agent 130 as being available transferring such information to target agent 135. In an embodiment, source agent 130 may, in response to the determining that first interface 140 is expected to be available, and prior to first interface 140 being available, designate the information in question for transmission via first interface 140.

As referred to herein, a hardware interface (or simply 'interface' herein) refers to a set of one or more hardware signal lines and/or connectors coupled at least between two agents, through which the two agents communicate with one another. In an embodiment, communication via an interface may be according to one or more protocols. By way of illustration and not limitation, first interface 140 and second interface 145 may variously include any of a variety of one or more shared and/or dedicated buses, and/or other sets of signal lines for exchanging data between components of computer 100. First interface 140 and second interface 145 may variously have, for example, hardware including, but not limited to, one or more of a PCI (Peripheral Component Interconnect) bus, a PCI Express bus, an I2C bus, an Industry Standard Architecture (ISA) bus, a system management bus (SMBus), a power management bus (PMBus), an Integrated Drive Electronics (IDE) bus, a Serial Advanced Technology Attachment (SATA) connector, a Parallel Advanced Technology Attachment (PATA) connector and/or various other similar connecting hardware.

Designating the information for transmission by first interface 140 may result in source agent 130 refraining from communicating the information to target agent 135 via second interface 145—e.g. notwithstanding an availability of second interface 145 which is earlier in time than an availability of first interface 140. For example, designating the information for transmission by first interface 140 may result in source agent 130 refraining from sending via second interface 145 any initial communication to target agent 135 after the power state transition has begun—e.g. instead, only initiating such communication via first interface 140.

Designating the information for transmission by first interface 140 may, for example, be in response to source agent 130 detecting some comparative benefit of deferring transmission of the information for some future availability of first interface 140, as compared to an earlier transmission of the information via the earlier-available second interface 145. For example, source agent 130 may perform a comparison or other evaluation of a performance metric (e.g. data rate, power consumption, etc.) for the first interface and a corresponding performance metric for the second interface. Designation of the information for transmission by first interface 140 may be based on source agent 130 detecting that first interface 140 has a better performance profile (faster, more power efficient and/or the like) as compared to that of second interface 145.

Figure 2:
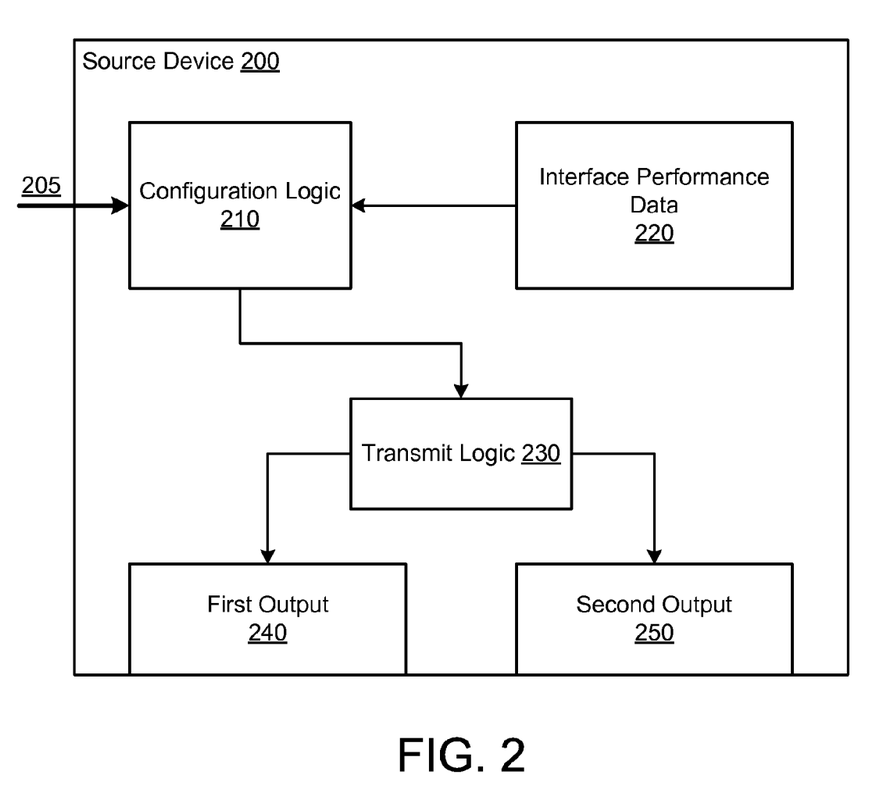
FIG. 2 is a block diagram showing select elements of a device for determining an interface according to an embodiment.

FIG. 2 illustrates select elements of a source device 200 for determining a communication interface according to an embodiment. Source device 200 may include logic to implement some or all of the features of source agent 130, for example. Source device 200 may also include logic to implement some or all of the features of target agent 135, for example, although certain embodiments are not limited in this regard.

In an embodiment, source device 200 includes logic for operation in a computer platform—e.g. that of computer 100. For example, source device 200 may include one or more of a first output 240 to couple source device 200 to a first interface of the computer platform, a second output 250 to couple source device 200 to a second interface of the platform, and transmit logic 230 to selectively transmit information via one or both of first output 240 and second output 250. It is noted that source device 200 may include any of a variety of additional or alternative mechanisms for variously exchanging information with other components of the computer platform, according to various embodiments.

Determining a communication interface may, for example, include source device 200 determining a particular output to an interface for exchanging information. In aid of such determining, source device 200 may include configuration logic 210 to designate information for transmission via a particular path (e.g. for a particular interface or output thereto), the designation based on information indicating a particular power state of the computer platform.

Configuration logic 210 may, for example, receive one or more signals 205—e.g. from a PMU of the computer platform—indicating a transition of the computer platform to a particular power state. The one or more signals 205 may, in an embodiment, include information such as that exchanged in one or more signals 120. For example, one or more signals 205 may include one or more of an identifier of a power state to which (or through which) the computer platform is to transition, an identifier of a power state transition taking place (or to take place), an identifier of a resource which is to be available during (and/or after) a power state transition and/or the like.

Source device 200 may include or otherwise provide to configuration logic 210 interface performance data 220 for associating information in one or more signals 205 with a current or expected future availability of an interface of the computer platform.

By way of illustration and not limitation, one or more signals 205 may identify or otherwise indicate to configuration logic 210 a power state to which or through which the computer platform is to transition. Based on the indication in one or more signals 205, configuration logic 210 may determine—e.g. with reference to interface performance data 220—that a particular interface of the computer platform is expected to be available after the transition of the computer platform to the power state. For example, interface performance data 220 may include information mapping an identifier of a power state, and/or an identifier of a power state transition, to an interface which is operative at some point during or after the computer platform being in that power state or power state transition.

In response to determining that the interface is expected to be available, configuration logic 210 may perform an evaluation to identify whether information is to be transmitted on the interface which is expected to be available. For example, the evaluation may include comparing a performance cost (or benefit) associated with transmitting the information via the interface which is expected to be available with a corresponding performance cost (or benefit) associated with transmitting the information via another interface of the computer platform. The other interface may, for example, be available to source device 200 before the interface in question becomes available.

Based on the evaluation, configuration logic 210 may signal transmit logic 230 to designate the information for transmission via the first interface. Designating the information for transmission via the first interface may include, for example, transmit logic 230 buffering the information to a buffer for an output corresponding to the interface which is expected to become available. Alternatively or in addition, the designation may include transmit logic 230 storing information to map, tag or otherwise correspond the information with the interface and/or its corresponding output of source device 200.

FIG. 3 illustrates select elements of a method 300 for proving information to determine a communication path according to an embodiment. Method 300 may be performed by a power management unit of a computer device. For example, method 300 may be performed by a PMU including some or all of the features of PMU 110. In an embodiment, method 300 may implement a power state transition of a computer platform—e.g. wherein the power state transition includes one of a wake up of the computer platform and a power on of the computer platform.

Method 300 may begin at some initial power state, during which, at 310, a test is performed to determine whether any signal has been received indicating a need for a power state transition. Such signal may, for example, be provided in response to a user operating a power switch, mouse, keyboard, touchpad or other input mechanism indicating an intent to operate the computer device. Alternatively or in addition, such a signal may be provided in response to a scheduling of some task which the platform is configured to perform automatically at some point in time. Any of a variety of additional or alternative signals may be tested for at 310, and the particular nature of the signal may not be limiting on certain embodiments.

In response to a power state transition being indicated, method 300 may, at 320, send an indication of a power state to some agent of the computer platform. The indication may, for example, be sent during an initial or intermediary power state of the power state transition, although certain embodiments are not limited in this regard. The indication may be sent to an agent which has, or which will have, information to be communicated to some other agent of the computer platform. By way of illustration and not limitation, the indication may include one or more of an identifier of the power state transition, an identifier of a power state to which (or through which) the computer platform is to transition, an identifier of a resource which is operative in such a power state and/or the like.

In an embodiment, the agent which is to receive the signal may be configured to identify in the signal—or determine from the signal and other reference data—an identifier of a resource which is expected to be available to the agent at some point during or after the power state transition. For example, the agent may detect an expected future (with respect to the time of detecting) availability of an interface for communication with another agent of the computer platform.

At some point after sending the indication of the power state, the method 300 may, at 330, test to determine whether one or more agents of the computer platform are ready for completion of the power state transition. By way of illustration and not limitation, the PMU may collect respective signals from one or more components of the computer platform, the signals indicating that one or more configurations and/or other conditions have been achieved by the one or more components. Method 300 may repeatedly perform test 330 until all relevant agents of the computer platform are determined to be ready for completing the power state transition.

Certain embodiments provide improved techniques to expediting the power state transition. For example, satisfying the test conditions at 330 may depend on one or more agents of the computer platform exchanging configuration information or other such communications to one another. Such inter-agent communication may be expedited by a given agent deferring communication via a particular interface in favor of a comparatively higher performance interface which is expected to become available at some later point in the power state transition. In response to the computer platform determining that all agents are ready, method 300 may, at 340, place the system in a final power state of the power state transition.

Figure 4:
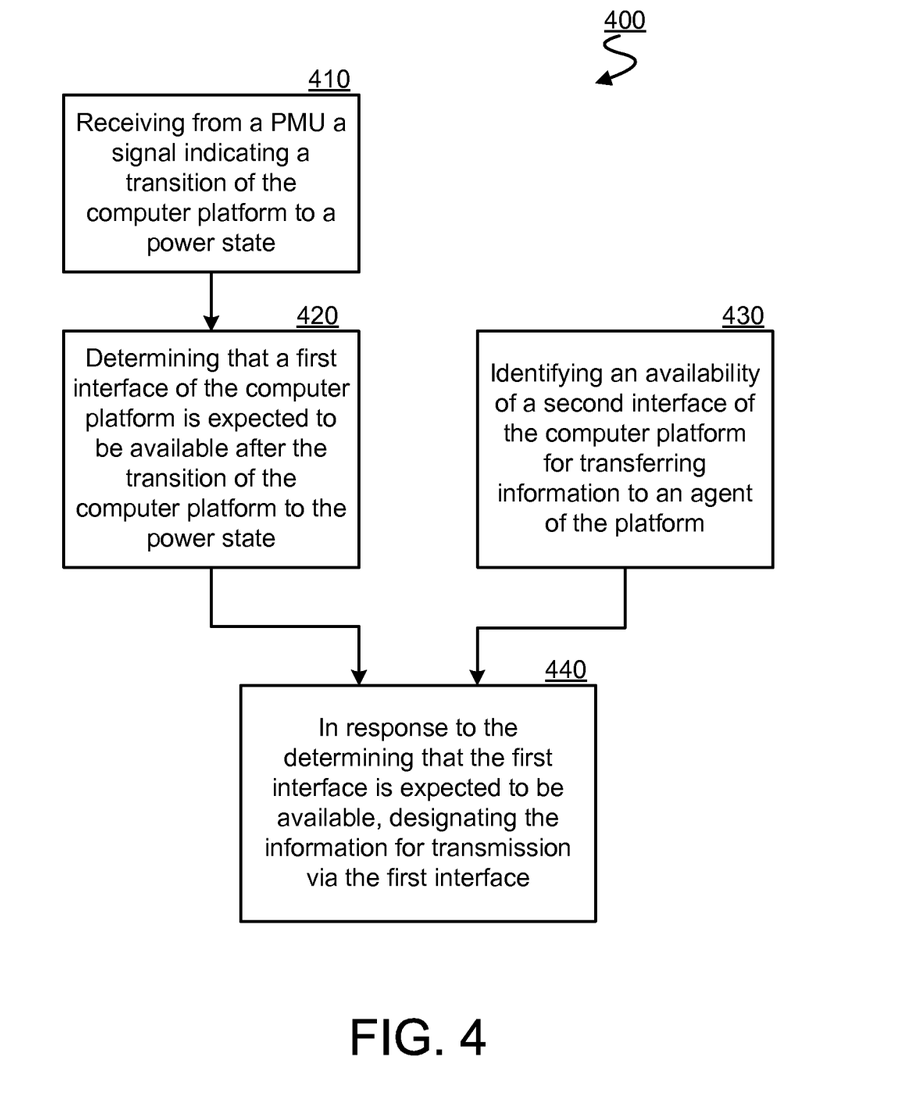
FIG. 4 is a flow diagram showing select elements of a method for determining an interface according to an embodiment.

FIG. 4 illustrates select elements of a method 400 for determining a communication interface according to an embodiment. Method 400 may be performed, for example, by an agent of a platform, such as that of computer 100, which is to operate as a source of information to be communicated to another agent of the platform. In an embodiment, method 400 is performed by a component device of a computer system, the device including some or all of the features of source device 200.

Method 400 may include, at 410, receiving from a PMU of the computer platform a signal indicating a transition of the computer platform to a particular power state. The signal may, for example, include information such as that which is sent in operation 320 of method 300. For example, operation 410 may provide information such as that included in the one or more signals 120.

Based on the signal, method 400 may, at 420, determine that a first interface of the computer platform is expected to be available after the transition of the computer platform to the indicated power state. The determining at 420 may, for example, include the source agent accessing reference information based on an identifier of the power state, and/or an identifier of the power state transition, which is included in the signal from the PMU. The reference information may, in an embodiment, associate the identified power state (and/or power state transition) with the interface—e.g. where the interface is recognized as being available to the source agent at some point after the computer platform transitions to the identified power state.

At some point prior to the first interface becoming available to the source agent, the source agent may have some information to exchange with another agent of the computer platform. Such information may include one or more configuration commands/values, acknowledgement messages and/or the like which, for example, must be communicated before some later stage of the power state transition can take place.

Method 400 may further include, at 430, identifying an availability of a second interface of the computer platform to the source agent for transferring such information to the other agent of the platform. It is noted that operation 420 may take place before, during or after operation 430, and that the order of operations 420, 430 with respect to one another is not limiting on certain embodiments. In response to the determining that the first interface is expected to be available, and prior to the first interface becoming available, method 400 may, at 440, designate the information as being for transmission via the first interface.

Figure 5:
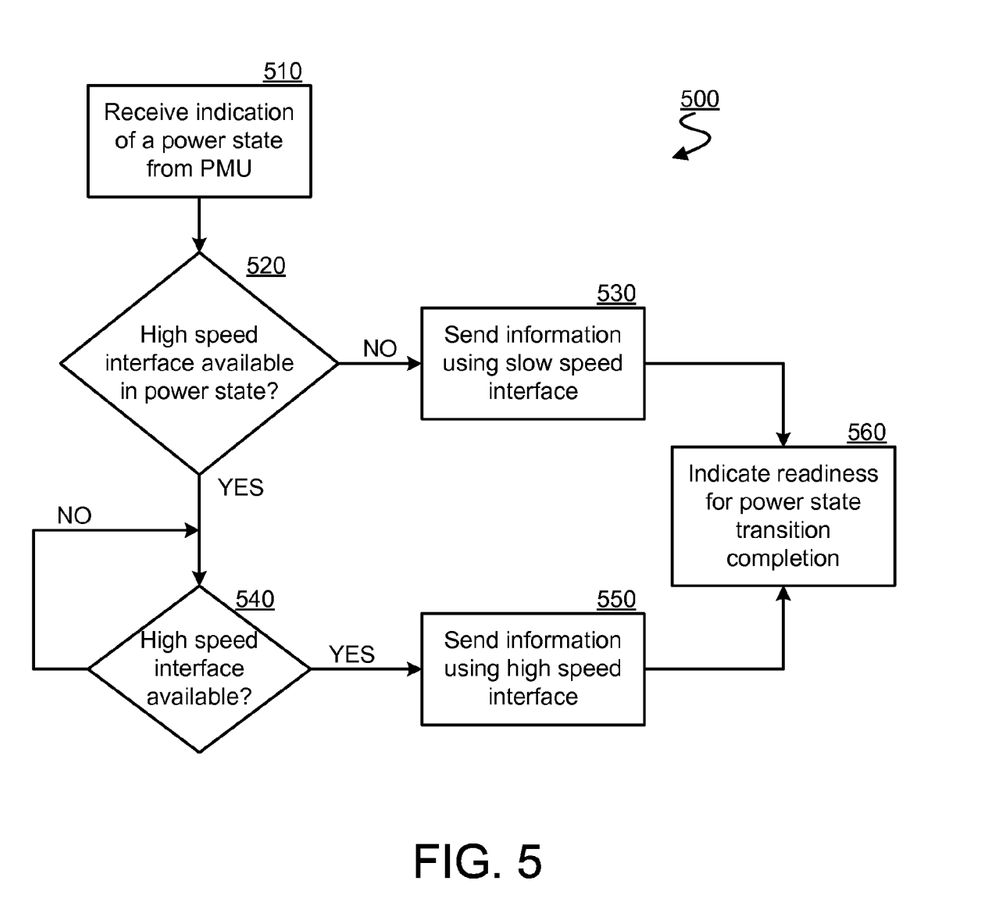
FIG. 5 is a flow diagram showing select elements of a method for performing a power state transition according to an embodiment.

FIG. 5 illustrates select elements of a method 500 for determining a communication interface according to an embodiment. Method 500 may be performed, for example, by an agent of a platform, such as that of computer 100, which is to operate as a source of information to be communicated to another agent of the platform. In an embodiment, method 500 is performed by a component device of a computer system, the device including some or all of the features of source device 200.

Method 500 may include, at 510, receiving an indication of a power state from a PMU. The received indication may, for example, include information such as that which is sent in operation 320 of method 300. For example, operation 510 may provide information such as that included in the one or more signals 120.

Based on the indication, method 500 may, at 520, test to determine whether a first "high speed" interface is available when the computer platform is in the indicated power state— e.g. where the high speed interface has some performance characteristic (e.g. data rate) which is faster than that of a second "low speed" interface. At some point prior to or during the testing at 520, the source agent may have information to communicate to another agent of the computer platform. If it is determined at 520 that the comparatively high speed interface is not available when the platform is in the indicated power state, then method 500 may, at 530, send the information to the other agent via the comparatively slow interface.

By contrast, if it is determined at 520 that the comparatively high speed interface is available when the platform is in the indicated power state, then method 500 may, at 540, begin testing to determine if the high speed interface actually is available. In an embodiment, the high speed interface may become available as a result of a turning on/powering-up (for example, by the PMU) of control logic or other logic for operating hardware of the higher power/higher performance interface—e.g. as part of waking up the platform to a comparatively more functional power state. Prior to such a more functional power state, the higher performance interface may have been previously unavailable, at least to the agent in question, because it was turned off to save power.

In an embodiment, testing for the availability of the high speed interface at 540 includes testing for a message which is sent to the agent, the message signaling such availability. For example, a message from the PMU may include contents (such as a flag bit) which directly or indirectly indicates that the high speed interface is available—e.g. indicating that the platform is currently in a power state which includes an operational state of the high speed interface. In an embodiment, testing for the availability of the high speed interface 540 may be subsequent to, and a result of, the information to be sent to the other agent having been designated as being for transmission via the first interface—e.g. rather than via the second interface.

Once it is determined that the high speed interface is available to the source agent, method 500 may, at 550, send the information to the other agent via the high speed interface. After the information is sent to the other agent—whether by the slow speed interface at 530 or by the high speed interface at 550—method 500 may, at 560, indicate to the PMU a readiness of the source agent for completion of the power state transition.

Figure 6:
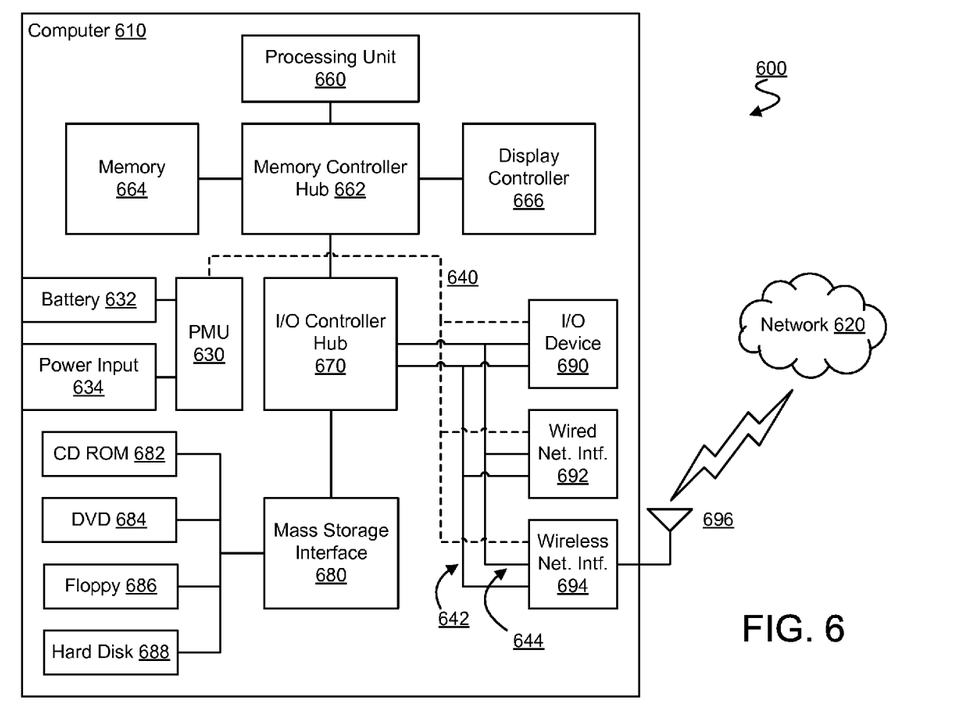
FIG. 6 is a block diagram showing select elements of a system for determining an interface according to an embodiment.

FIG. 6 is a diagram illustrating select elements of a system 600 for determining a communication path according to an embodiment. In an embodiment, system 600 includes a computer 610 coupled to a network 620. Computer 610 may include a laptop computer, a handheld computer, a tablet computer, a desktop computer, a television, a cellular telephone (e.g., a smart phone), a pager, an audio and/or video player (e.g., an MP3 player or a DVD player), a game device, a digital camera and/or other suitable electronic devices. In an embodiment, computer 610 includes some or all of the features of computer 100.

Computer 610 represents an illustrative computer architecture in which certain embodiments may be practiced. By way of illustration and not limitation, computer 610 may include a processor unit 660, a memory controller hub (MCH) 662, a main memory 664, a display controller 666, an input/output controller hub (ICH) 670 and a mass storage interface 680. It should be noted that certain components of computer 610 and/or their relative configuration with respect to one another, are merely illustrative. One of ordinary skill in the computing arts would understand from the discussion herein that any of a variety of combinations of additional or alternative components—and/or any of a variety of other configurations thereof—may be provided to implement various embodiments.

Processor unit 660 represents a central processing unit of any type of architecture, such as processors using hyper threading, security, network, digital media technologies, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

MCH 662 may provide control and configuration of memory and input/output devices such as main memory 664 and ICH 670. MCH 662 may be integrated into a chipset that integrates multiple functionalities such as graphics, media, host-to-peripheral bus interface, memory control, power management, etc. MCH 662 or memory controller functionality in MCH 662 may be integrated in processor unit 660. In some embodiments, the memory controller, either internal or external to processor unit 660, may work for all cores or processors in processor unit 660. In other embodiments, MCH 662 may include different portions that may work separately for different cores or processors in processor unit 660.

Main memory 664 may store system code and/or data. Main memory 664 may, for example, be implemented with DRAM, SRAM, or any other types of memories including those that do not need to be refreshed. Main memory 664 may include multiple channels of memory devices such as Double Data Rate (DDR2) DRAMs.

Display controller 666 may, in an embodiment, include a processor that provides display functionalities. Display controller 666 may be integrated into MCH 662 to form a Graphics and Memory Controller Hub (GMCH). Display controller 666 may be a graphics card such as the Graphics Performance Accelerator (AGP) card, interfaced to MCH 666 via a graphics port such as the Accelerated Graphics Port (AGP) controller. Display controller 666 may provide an interface to a display monitor such as standard progressive scan monitor, television (TV)-out device, and Transition Minimized Differential Signaling (TMDS) controller. The display monitor may be any display device such as Cathode Ray Tube (CRT) monitor, TV set, Liquid Crystal Display (LCD), Hat Panel, and Digital CRT.

ICH 670 has a number of functionalities that are designed to support I/O functions. ICH 670 may also be integrated into a chipset together or separate from MCH 662 to perform I/O functions. ICH 670 may include a number of interface and I/O functions such as peripheral component interconnect (PCI) bus interface, processor interface, interrupt controller, direct memory access (DMA) controller, power management logic, timer, system management bus (SMBus), USB interface, mass storage interface, low pin count (LPC) interface, etc.

One or more interconnects may provide interface to peripheral devices. Some or all of such interconnects may be point-to-point or connected to multiple devices. For clarity, not all interconnects are shown. It is contemplated that such interconnects may include any interconnect or bus such as Peripheral Component Interconnect (PCI), PCI Express, USB, and Direct Media Interface (DMI), etc.

Mass storage interface 680 may provide interface to devices that store archive information such as code, programs, files, data, and applications. Mass storage interface 680 may provide interface to a compact disk (CD) read-only memory (ROM) 682, a digital video/versatile disc (DVD) 684, a floppy drive 686, and a hard drive 688, and any other magnetic or optic storage devices. Mass storage interface 680 may provide a mechanism to read machine-accessible media. I/O device 690 may include any of a variety of I/O devices to perform I/O functions. Examples of I/O device 690 include controller for input devices (e.g., keyboard, mouse, trackball, pointing device), media card (e.g., audio, video, graphic), network card, and any other peripheral controllers.

In an embodiment, computer 610 includes a power management unit 630 to manage one or more power state conditions. For example, PMU 630 may be coupled to regulate a delivery of power provided via a battery 632 and/or via a power input 634 of computer 610. PMU 630 may, in an embodiment, provide one or more signals to respective agents of computer 610—e.g. the signals to indicate a power state to which (e.g. through which) computer 610 is to transition.

By way of illustration and not limitation, PMU 630 may send a signal to a wireless network interface 694 of computer 630—e.g. via a control line 640. Wireless network interface 694 may include logic to exchange wireless communications between computer 610 and network 620—e.g. via one or more antennae 696. PMU 630 may additionally or alternatively indicate the power state to any of a variety of additional or alternative agents of computer 610—e.g. to a Gigabit Ethernet controller in wired network interface 692. Based on the indication provided by the PMU 630, the wireless network interface 694 may determine that an interface 642 of the platform is to become available—e.g. at some future time with respect to the time of such determining.

At some point prior to the interface 642 becoming available, wireless network interface 694 may identify some information that needs to be communicated to another agent of the platform—e.g. to PMU 630. Wireless network interface 694 may further determine that some other interface 644 (other than the interface 642) is already available for communicating such information to the other agent. In response to the determining that the interface 642 is expected to become available, wireless network interface 694 may designate the information for transmission via interface 642—e.g. rather than transmitting the information via the earlier-available interface 644.

Techniques and architectures for determining exchanging information in a computer platform are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method at a device of a computer platform, the method comprising:
   receiving from a power management agent of the computer platform a signal indicating a transition of the computer platform to a power state;
   based on the signal, determining that a first interface of the computer platform is expected to be available after the transition of the computer platform to the power state; and
   prior to the first interface being available:
      identifying an availability of a second interface of the computer platform for transferring information to an agent of the platform; and
      in response to the determining that the first interface is expected to be available, designating the information for transmission via the first interface.

2. The method of claim 1, wherein the device includes a Gigabit Ethernet controller.

3. The method of claim 1, wherein the signal includes an identifier of the first interface.

4. The method of claim 1, wherein the signal includes an identifier of the power state.

5. The method of claim 4, wherein determining that the first interface is expected to be available includes:
   based on the identifier of the power state, accessing information associating the power state with the first interface.

6. The method of claim 1, further comprising:
   performing an evaluation of a performance metric for the first interface and a performance metric for the second interface;
   wherein the designating the information for transmission via the first interface is based on the performed evaluation.

7. The method of claim 1, wherein the transition to the power state includes one of a wake up of the computer platform and a power on of the computer platform, the method further comprising:
   sending an initial communication from the device to the agent after the one of a wake up of the computer platform and a power up of the computer platform, wherein the initial communication is via the first interface.

8. A device for operation in a computer platform, the device comprising:
   configuration logic to receive from a power management controller of the computer platform a signal indicating a transition of the computer system to a power state, the configuration logic further to determine based on the signal that the first interface of the computer platform is expected to be available after the transition to the power state; and
   transmit logic coupled to the configuration logic, wherein prior to the first interface being available, the transmit logic to identify an availability of the second interface of the computer platform for transferring information to an agent of the computer platform;
   wherein prior to the first interface being available and in response to the first interface being expected to be available, the configuration logic further to signal the transmit logic to designate the information for transmission via the first interface.

9. The device of claim 8, wherein the device includes a Gigabit Ethernet controller.

10. The device of claim 8, wherein the agent is the power management controller.

11. The device of claim 8, wherein the signal includes an identifier of the first interface.

12. The device of claim 8, wherein the signal includes an identifier of the power state.

13. The device of claim 12, wherein the first agent to determine that the first interface is expected to be available includes:
   based on the identifier of the power state, the first agent to access information associating the power state with the first interface.

14. The device of claim 8, wherein:
   the first agent further to perform an evaluation of a performance metric for the first interface and a performance metric for the second interface;
   wherein the first agent further to designate the information for transmission via the first interface is based on the performed evaluation.

15. A computer system comprising:
   a power management controller to manage a power state transition of the computer system;
   a device coupled to the power management controller, the device including:
      configuration logic to receive from the power management controller of the computer platform a signal indicating a transition of the computer system to a power state, the configuration logic further to determine based on the signal that the first interface of the computer platform is expected to be available after the transition to the power state; and
      transmit logic coupled to the configuration logic, wherein prior to the first interface being available, the transmit logic to identify an availability of the second interface of the computer platform for transferring information to an agent of the computer platform;

wherein prior to the first interface being available and in response to the first interface being expected to be available, the configuration logic further to signal the transmit logic to designate the information for transmission via the first interface; and an antenna coupled to the device, the antenna to exchange signals between the computer system and a wireless network.

16. The computer system of claim 15, wherein the device includes a Gigabit Ethernet controller.

17. The computer system of claim 15, wherein the agent is the power management controller.

18. The computer system of claim 15, wherein the signal includes an identifier of the first interface.

19. The computer system of claim 15, wherein the signal includes an identifier of the power state, and wherein the first agent to determine that the first interface is expected to be available includes:

based on the identifier of the power state, the first agent to access information associating the power state with the first interface.

20. The computer system of claim 15, wherein:

the first agent further to perform an evaluation of a performance metric for the first interface and a performance metric for the second interface;

wherein the first agent further to designate the information for transmission via the first interface is based on the performed evaluation.

* * * * *